US008290537B2

(12) United States Patent
Lee et al.

(10) Patent No.: US 8,290,537 B2
(45) Date of Patent: Oct. 16, 2012

(54) SIDETONE ADJUSTMENT BASED ON HEADSET OR EARPHONE TYPE

(75) Inventors: Michael M. Lee, San Jose, CA (US); Justin Gregg, San Francisco, CA (US); Chad G. Seguin, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 982 days.

(21) Appl. No.: 12/210,803

(22) Filed: Sep. 15, 2008

(65) Prior Publication Data

US 2010/0069114 A1    Mar. 18, 2010

(51) Int. Cl.
*H04M 1/00* (2006.01)
*H04B 1/38* (2006.01)
*H04R 3/00* (2006.01)
*H04R 5/02* (2006.01)

(52) U.S. Cl. .......... 455/556.1; 455/550.1; 455/557; 455/570; 381/95; 381/309

(58) Field of Classification Search .............. 455/556.1, 455/557, 570, 550.1; 381/95, 309
See application file for complete search history.

(56) References Cited

U.S. PATENT DOCUMENTS

| | | | |
|---|---|---|---|
| 7,881,927 B1* | 2/2011 | Reuss | 704/226 |
| 2003/0191609 A1* | 10/2003 | Bernardi et al. | 702/191 |
| 2004/0237750 A1* | 12/2004 | Smith et al. | 84/1 |
| 2006/0184473 A1* | 8/2006 | Eder | 706/20 |
| 2008/0112572 A1* | 5/2008 | Wong et al. | 381/74 |
| 2008/0167092 A1* | 7/2008 | Ueda et al. | 455/575.2 |
| 2009/0112589 A1* | 4/2009 | Hiselius et al. | 704/246 |
| 2010/0046767 A1* | 2/2010 | Bayley et al. | 381/59 |

OTHER PUBLICATIONS

Goodman, D.J., et al., "Sidetone Expansion for the Regulation of Talker Loudness", Electronics Letters, vol. 15, No. 16, Aug. 2, 1979, Bell Laboratories, Crawford Hill Laboratory, Holmdel, U.S.A., ISSN: 0013-5194—Digital Object Identifier: 10.1049/el:19790355, (pp. 492-493).

* cited by examiner

*Primary Examiner* — Jean A Gelin
*Assistant Examiner* — Edd Rianne Plata
(74) *Attorney, Agent, or Firm* — Blakely, Sokoloff, Taylor & Zafman LLP

(57) ABSTRACT

A portable telephony device has a mobile phone housing. Integrated in the housing are memory to store a telephony module, an earphone type detect module, a headphone port, and a processor. The headphone port may be a wired headset jack to receive a mating wired headset plug, or it may be a communications subsystem that makes a wireless connection with a wireless headset. The earphone type detect module, when executed by the processor, is to determine what type of earphone or headset is connected to the headphone port. The telephony module when executed by the processor is to adjust a sidetone function of the device as a function of the determined type of earphone, and apply sidetone in accordance with said adjusted sidetone function. Other embodiments are also described and claimed.

22 Claims, 6 Drawing Sheets

US 8,290,537 B2

SIDETONE ADJUSTMENT BASED ON HEADSET OR EARPHONE TYPE

FIELD

An embodiment of the invention is directed to technology for implementing telephone call communications using earphones or headsets, and in particular to implementing sidetone (feeding back a small amount of the talker's voice during a call), so that the talker hears some of his own voice through the earphone.

BACKGROUND

To enable a talker to hear some of her own voice during a telephone call conversation, telephone handsets implement a sidetone function that feeds back some of the talkers voice to the receiver of the handset. Doing so gives the talker a better feel for the conversation as he can respond to hearing his own voice by adjusting how loudly he speaks, which also benefits the listener at the other end of the conversation. In some telephony handsets, the sidetone level can be manually adjusted by the talker. For example, if the talker is in a noisy environment, such as a windy day or near a railroad track or airport, he can lower the sidetone level, which may help him better hear the other side of the conversation.

Consumers are welcoming the use of in-ear earphones (or simply earbuds) for listening to music that is being played by their portable multifunction devices such as the IPOD and IPHONE handheld devices by Apple Inc. Earbuds facilitate listening to high fidelity sound by making an airtight seal with the users ear canal, behind the earbud's sound output port. The IPHONE device is a multi-function handheld device that can also be used as a cellular telephone handset, i.e. it has "mobile phone" or telephony functionality. Users of such devices may also want to make and answer wireless telephone calls while wearing the earbuds. Therefore, the multi-function device also needs to provide the proper sidetone level through its earbuds, when it is being used as a telephone handset.

SUMMARY

An embodiment of the invention is a machine-implemented method for operating a telephony device by automatically determining the type of earphone or headset that is connected to the device, and adjusting a sidetone function of the device, based on the determined type of earphone. Sidetone is then applied to the connected earphone, while the device is operating in its telephone mode working a telephone call, in accordance with the adjusted sidetone function.

In another embodiment, the telephony device automatically determines whether a connected earphone is or is not a sealing, in-ear type. A sidetone function is then adjusted based on that determination. Sidetone is then applied to the connected earphone, in accordance with the adjusted sidetone function. For example, a low frequency response of the sidetone function is reduced while a high frequency response of the function is increased, when it has been determined that the connected earphone is a sealing in-ear type.

In a further embodiment of the invention, a portable telephony device has a built-in screen on which a number of user-selectable earphone or headset profiles are displayed. Each profile includes a respective set of one or more sidetone parameters that define aspects of the frequency response of a sidetone generator. The user makes a selection from these profiles, and the device in response applies sidetone (during a call) in accordance with the respective sidetone parameters of the selection.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 1 is a block diagram of a portable telephony device that is capable of automatically selecting different sidetones for a variety of different earphones that may be plugged in.

DETAILED DESCRIPTION

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
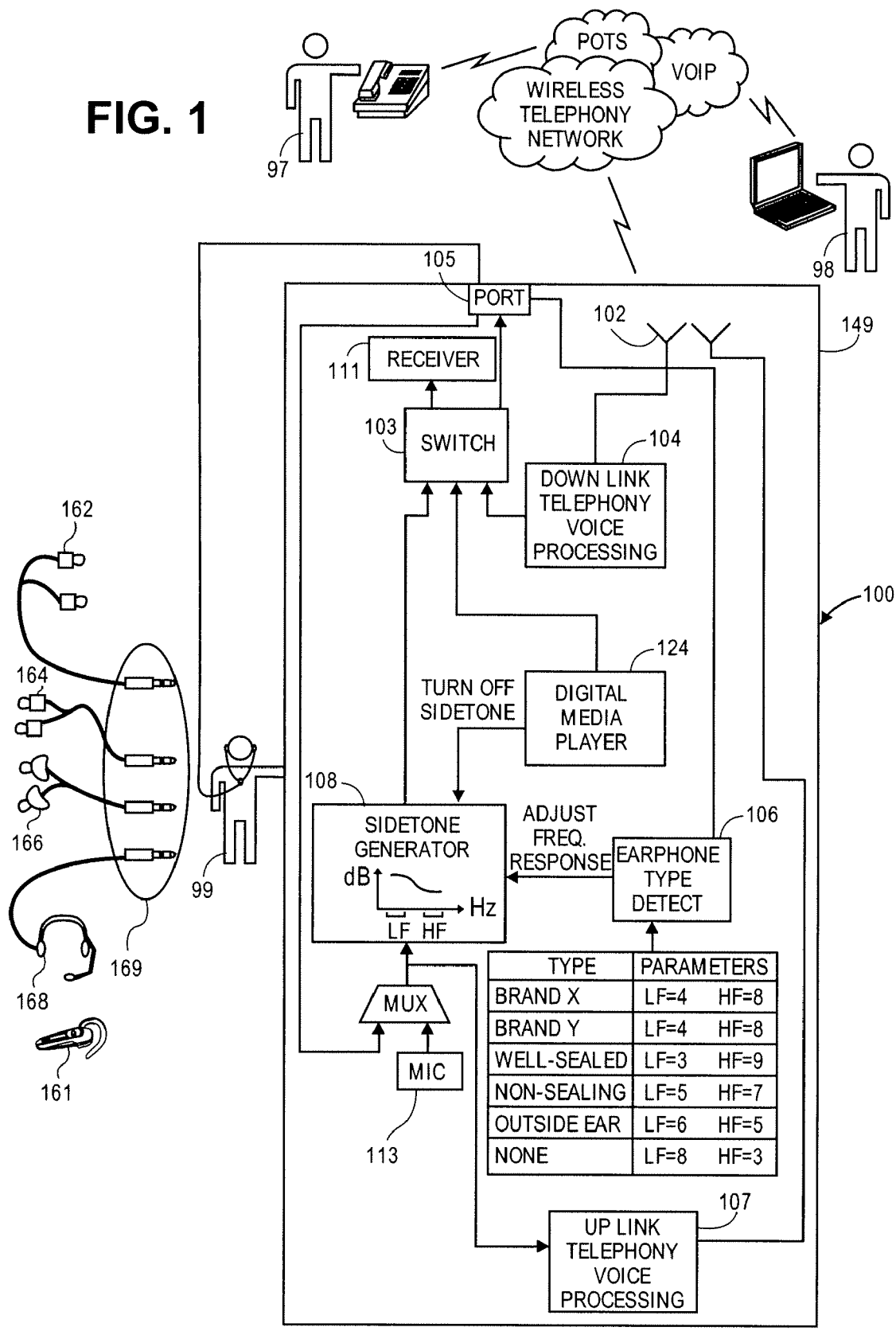

FIG. 1 is a block diagram of a portable or mobile telephony device 100 that is capable of automatically selecting the appropriate sidetone for a variety of different earphones that may be plugged into it. The telephony device 100 is made of a housing 149 within which are integrated several components, including a receiver 111 (earpiece speaker), a microphone 113 (mouthpiece), a display screen (not shown), and an antenna 102 and associated circuitry for performing a phone call with a destination phone over a wireless telephony network (not shown). The telephony device 100 may also have a subscriber identity module (SIM) card, which is a detachable smart card that contains the subscription information of its user or owner 99, and may also contain a contacts list of the user 99. A downlink telephony voice processing block 104 includes the needed hardware and/or software to perform a wireless phone call using any known cellular telephone communication network protocols, including, for example, global system for mobile communications (GSM), enhanced data rate for GSM evolution (EDGE), worldwide interoperability for microwave access (WiMAX), and voice over internet protocol (VOIP) via a wireless protocol such as wireless local area networking in accordance with IEEE 802.11g (WiFi). The downlink processing 104 delivers the audio signal received from the cellular network (which includes conversation of one or more other participants 97, 98 in the phone call) to a switch 103.

The switch 103 can alternatively deliver the downlink voice signal to either a receiver 111 (earpiece) or a headphone port 105. The headphone port 105 may be a headphone jack with or without associated analog circuitry. Alternatively, the headphone port 105 may be a wireless headset subsystem, e.g. one that operates in accordance with a Bluetooth wireless communications protocol. In addition, there may also be a speakerphone (not shown) that may be coupled to the output of the switch 103, so that the phone call can be heard by the user 99 through the speakerphone, rather than through the receiver 111 or headphone port 105. The switch 103 would, for example, automatically route the downlink voice signal to the headphone port 105 if the insertion of a headphone plug 169 has been detected through the headphone port 105. As shown in FIG. 1, there may be several different types of earphones from which the user 99 of the telephony device 100 can select, to listen to music or engage in a phone call using the device 100. The earphone may be part of a wireless headset 161. Alternatively, the earphone may be part of a wired headphone or headset assembly 162, 164, 166, 168 which connects to a mating headphone jack (of the headphone port 105) through an attached headphone plug 169 as shown. Note that the terms "headphone" and "headset" are interchangeable here.

To enable a two-way conversation during a wireless phone call, an uplink telephone voice processing block 197 is provided that includes the needed hardware and/or software to deliver the audio signal generated by the internal microphone 113 or an external microphone of a headset, to the antenna 102 and its associated RF circuitry, for transmission into the wireless telephony network.

The telephony device 100 may be a multi-function device in that it could have, for example, a digital media player 124 integrated in the housing 149. An example is an MP3 player that is capable of decoding compressed music files for playback through the headphone port 105 or the speakerphone (not shown). When the device 100 is operating in a digital media player mode, the sidetone is turned off, so that there may be no feedback from the microphone 113 to the receiver 111 or headphone port 105. In contrast, when the device 100 is operating in a telephone mode and working a live, two-way telephone call, a sidetone signal is produced by the sidetone generator 108 (based on input received from the microphone 113 or from an external, headset microphone). This sidetone is fed to the receiver 111 or headphone port 105 (through the switch 103). The sidetone would be combined by the switch 103 with the downlink voice signal (from downlink telephony voice processing 104) and then delivered to either the receiver 111 or headphone port 105.

When using in-ear earphones, such as the earphones of headset assemblies 162, 164, and 166 depicted in FIG. 1, the user may be somewhat isolated from external sounds during a wireless phone call. The degree of isolation, however, depends greatly upon the seal that the in-ear earphones (or earbuds) make with the user's ear canal. Higher end and more expensive earbuds tend to make a relatively tight seal in the ear canal, thereby greatly isolating the user from external sounds. Such external sounds may be detrimental to the quality of the sound detected by the microphone and that is then transmitted to the participants 97, 98 at far end of the conversation (via uplink telephone voice processing circuitry 107). Because of the relatively tight seal of the earbud, the user 99 at the near end of the conversation would have little to no feedback of, for example, the level or nature of the external noise in her environment that is also picked up by the microphone. For example, assume the user 99 is outside walking on a windy day and has plugged into the device 100 a set of headphones 164 whose earbuds make a relatively tight seal to her ears. It would be extremely difficult for the user 99 to know that her headset microphone is picking up wind noise, unless the sidetone being applied to the connected earbud is increased, e.g. the sidetone gain is increased. A similar situation exists for the user 99 if she is using the earbud for a phone call made while she is in a loud room or in another place that is inherently noisy. The solution here is to "stimulate" the user 99 with a lower level of sidetone so that she speaks more loudly into the microphone, to thereby hear herself better and overcome the external noise. This enables the far side of the conversation to also better hear the user 99 over the external noise.

In accordance with an embodiment of the invention, the telephony device 100 can automatically determine what type of earphone is connected to its headphone port 105. The reference to "earphone" here is intended to include not just in-ear earphones (earbuds), with or without associated external microphones, but also outside-the-ear headsets 168 such as those that have an external microphone boom. The earphones and the associated external microphone can in each case be communicatively coupled to or connected to the headphone port 105, by inserting the headphone plug 169 into a mating jack of the headphone port 105 in the case of a wired interface, or by performing wireless protocol handshaking and then completing a wireless connection in the case of a wireless interface (e.g., a Bluetooth interface). Referring to FIG. 1 still, this determination of the type of earphone may be made by an earphone type detector 106, which includes hardware circuitry and/or software being executed by a processor, that has been designed to sense signals in the headphone port 105 to make its decision, as described below in connection with FIG. 2A, FIG. 2B, and FIG. 3.

Once the type of earphone has been determined, a sidetone function of the device, that is to be applied to produce sidetone in, for example, the connected earphone through the headphone port 105, is adjusted. This may be done as depicted in FIG. 1, by adjusting the frequency response or transfer function of a sidetone generator 108. Once again, the sidetone generator 108 may be implemented as hardware circuitry and/or software being executed by a processor, which takes as input an audio signal generated by the internal microphone 113 or by an external microphone that is part of the headset assembly 161, 162, 164, 166, or 168. The sidetone generator 108 may include a digital filter and perhaps analog signal conditioning components whose frequency response may be adjusted by adjusting its filter coefficients (in the case of for example finite impulse response, FIR, or infinite impulse response, IIR, filters implemented by a digital signal processor, DSP) or by setting DSP and/or analog gain or attenuation levels. The generator 108 produces an output sidetone signal that is fed to the switch 103. The latter then combines the sidetone signal with the downlink telephony signal (from downlink voice processing 104) and provides this combination signal to either the receiver 111 or, in this case, to the headphone port 105 (because the user 99 has connected an earphone to the port 105). This results in the user 99 of the device 100 hearing a "small" sampling of his voice during a two-way telephone call. The sidetone applied to the connected earphone would be in accordance with the adjusted sidetone function. The sidetone gain may be adjusted (based on the type of earbud that is connected to the headphone port 105). As another example, the sidetone function may be adjusted by reducing a low frequency response while increasing a high frequency response of the sidetone generator 108, when it has been determined that the connected earphone is a sealing in-ear type (as opposed to a non-sealing type). Thus, for instance, the frequency response would be reduced below 300 Hz, and increased above 2 kHz, whenever the connected earphone is a sealing type. Of course, other low and high frequency ranges are possible.

Still referring to FIG. 1, the type of earphone may be determined by selecting from amongst multiple, predetermined types whose characteristics or identifiers have been previously stored in the device 100. Thus, for example, in FIG. 1, the earphone type detector 106 may refer to a stored lookup table of various types of earphones, to obtain the corresponding or associated sidetone parameters in accordance with which the sidetone function is adjusted. In this example, there are two sidetone parameters listed, namely a low frequency parameter and high frequency parameter. More generally however, a simpler or more complicated set of parameters may be defined. The stored lookup table may include records or entries for the following types of earphones: well-sealed, in-ear; not so well-sealed in-ear; non-sealing in-ear, and outside-the-ear. In addition, there may also be a further record or entry for the situation where no earphone is connected ("none")—that may correspond to the instance where the user 99 has no headset connected to any headphone port 105 and the device 100 has in response automatically activated either the receiver 111 or the speakerphone for the telephone call.

In another embodiment of the invention, the earphone type detector 106 automatically determines only whether an earphone that is connected to the headphone port is or is not a sealing in-ear type. In that case, the device 100 would contain a set of sidetone parameters associated with a generally sealing in-ear type, and another set of sidetone parameters associated with a generally non-sealing earphone. Once again, the sidetone function would be adjusted based on that determination, and sidetone would be applied to the connected earphone in accordance with the adjusted sidetone function.

Figure 2A:
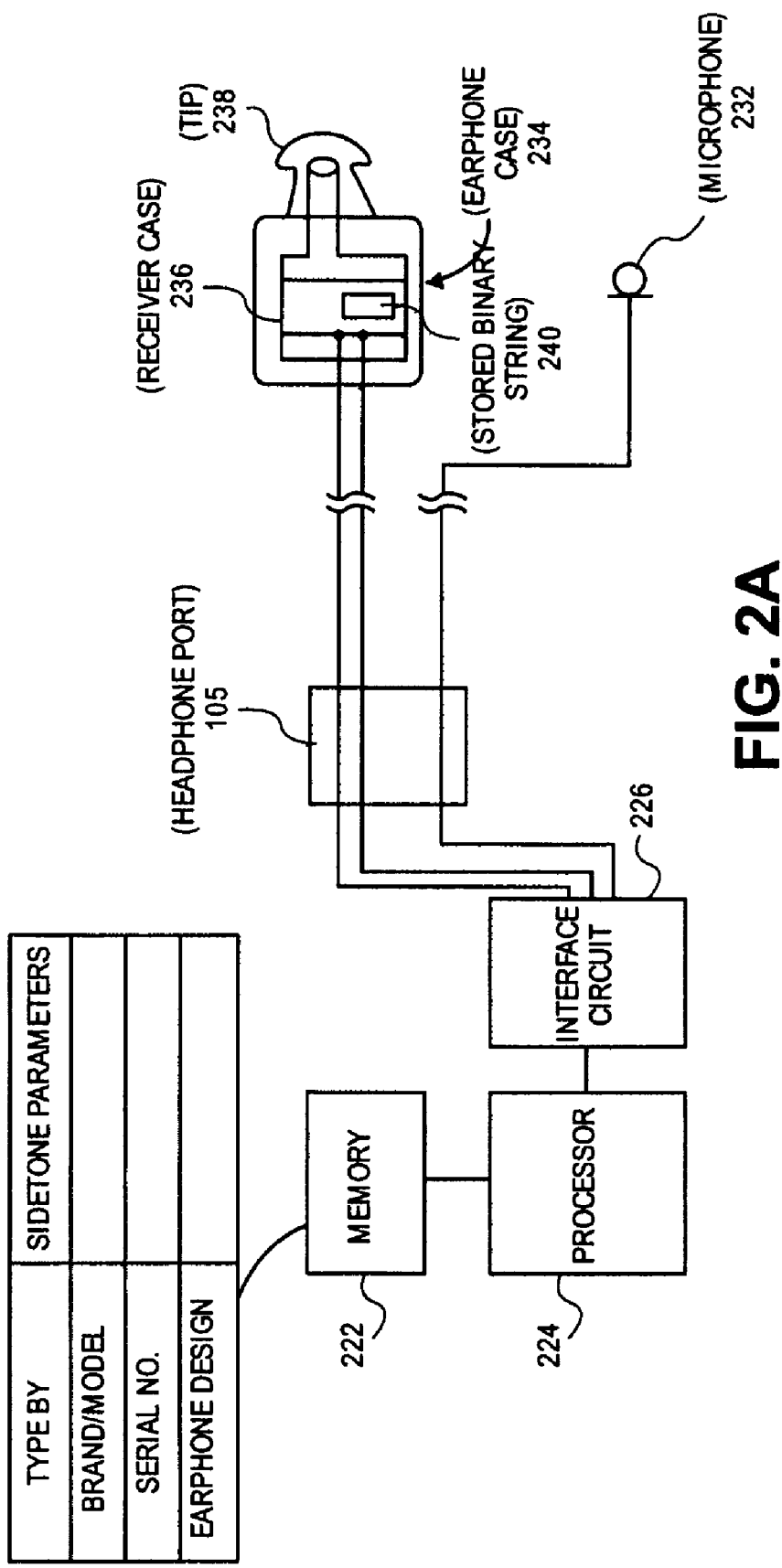
FIG. 2A is a circuit diagram of components internal to the telephony device that enable an example technique for automatic determination of the type of earphone using a wired headphone port.

There are several techniques for automatically determining the type of earphone or headset that is connected. FIG. 2A shows one embodiment where the device 100, through processor 224 executing instructions in memory 222, reads a stored binary string 240 through the headphone port 105 to which a wired headset is connected. The wired headset has an earphone case 234 and an associated, external microphone 232. Both are cabled together to the same headset plug 169 (see FIG. 1), which the user has plugged into a mating headset jack of the headphone port 105. A tip 238 may be fitted to the sound port of the earphone case 234 as shown, to provide a seal with the user's ear canal. Inside the device 100, an interface circuit 226 connects the processor 224 and the headphone port 105, to enable the needed signal translations, for example, between wired signaling in a headset jack and signaling by the processor 224. The binary string 240 may be stored inside the earphone case 234, e.g. in solid-state memory within a receiver case 236 that also contains the sound generating driver of the earphone. Any suitable form of digital conductive signaling may be used to read the stored binary string 240 through the earphone cable in this case. The information provided in the binary string 240 may identify or describe the earphone type by, for example, a brand and/or model designation, a manufacturer serial number, or an earphone design code (e.g., one that indicates how well the tip 238 seals with the user's ear canal).

To simplify the task of the earphone or headset manufacturer, the binary string 240 need only identify the type of earphone or headset as described here, without having to specifically reference any sidetone parameters. The latter may be determined through, for example, laboratory testing of the earphone by the manufacturer of the telephony device 100. Those sidetone parameters could then be stored in the memory 222, by the manufacturer of the device 100.

Figure 2B:
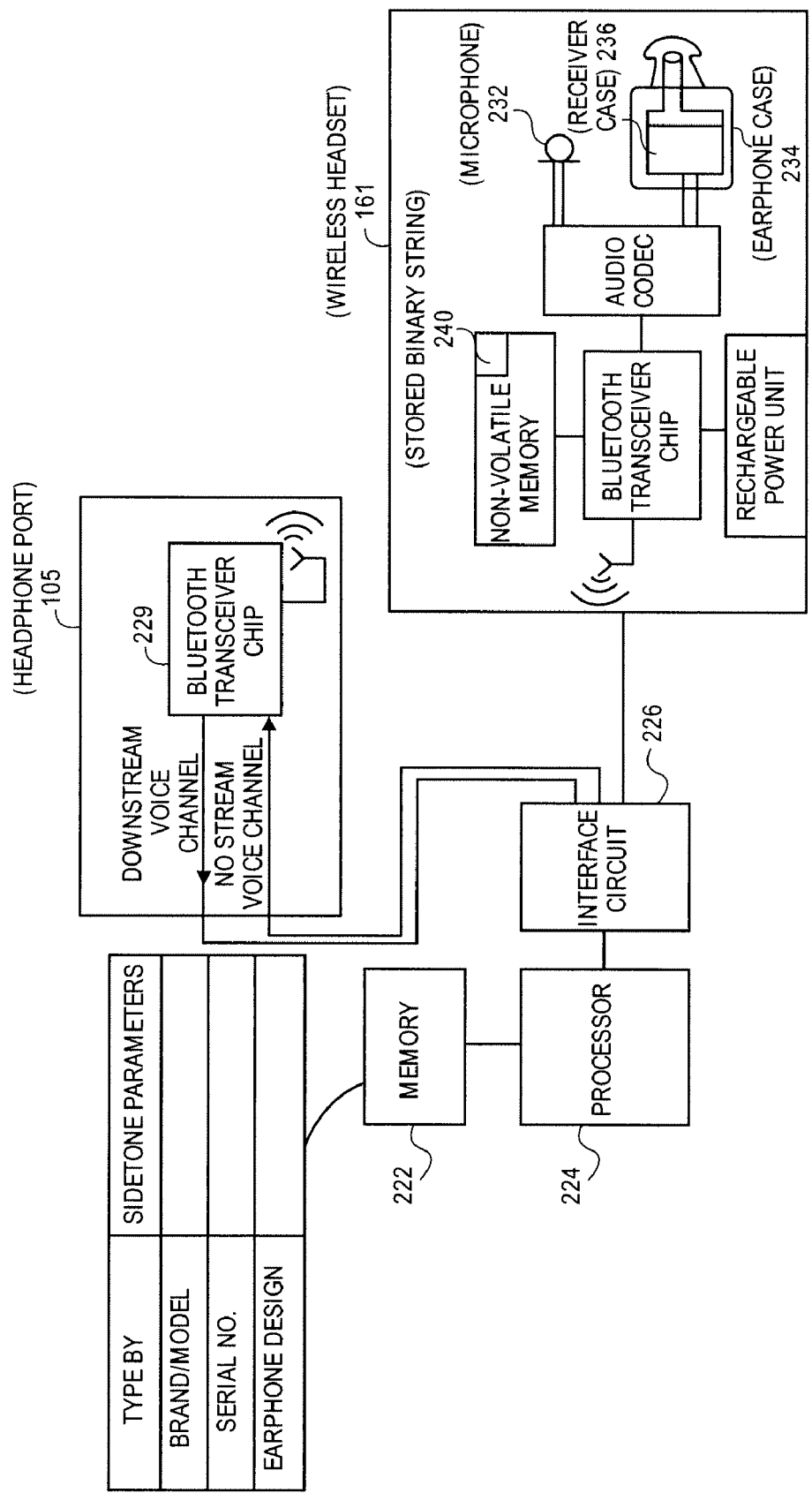
FIG. 2B shows a circuit diagram of an example technique for automatic determination of earphone type using a wireless headphone port.

FIG. 2B depicts another technique for automatically determining the type of earphone or headset that is connected. In this case, both the headphone port 105 and the headset 161 are wireless communications subsystems that connect with each other to support simultaneous wireless voice channels, namely downstream (from microphone 232) and upstream (to receiver case 236). The example shown uses a pair of mating Bluetooth transceiver chips 229, 239, though other short range wireless communications protocols are possible. In the headset 161, an audio codec is coupled between the transceiver chip 239 and the microphone 232/earphone receiver case 236. The headset 161, being a wireless unit, has its own rechargeable power unit. In this embodiment, the processor 224 recognizes or detects that a wireless headset 161 is connected to the headphone port 105, and then proceeds with accessing the non-volatile memory (integrated in the headset 161) in which the binary string 240 is stored. The binary string 240 may also include other protocol-dependent data, e.g. BlueTooth media access control, MAC, address.

Figure 3:
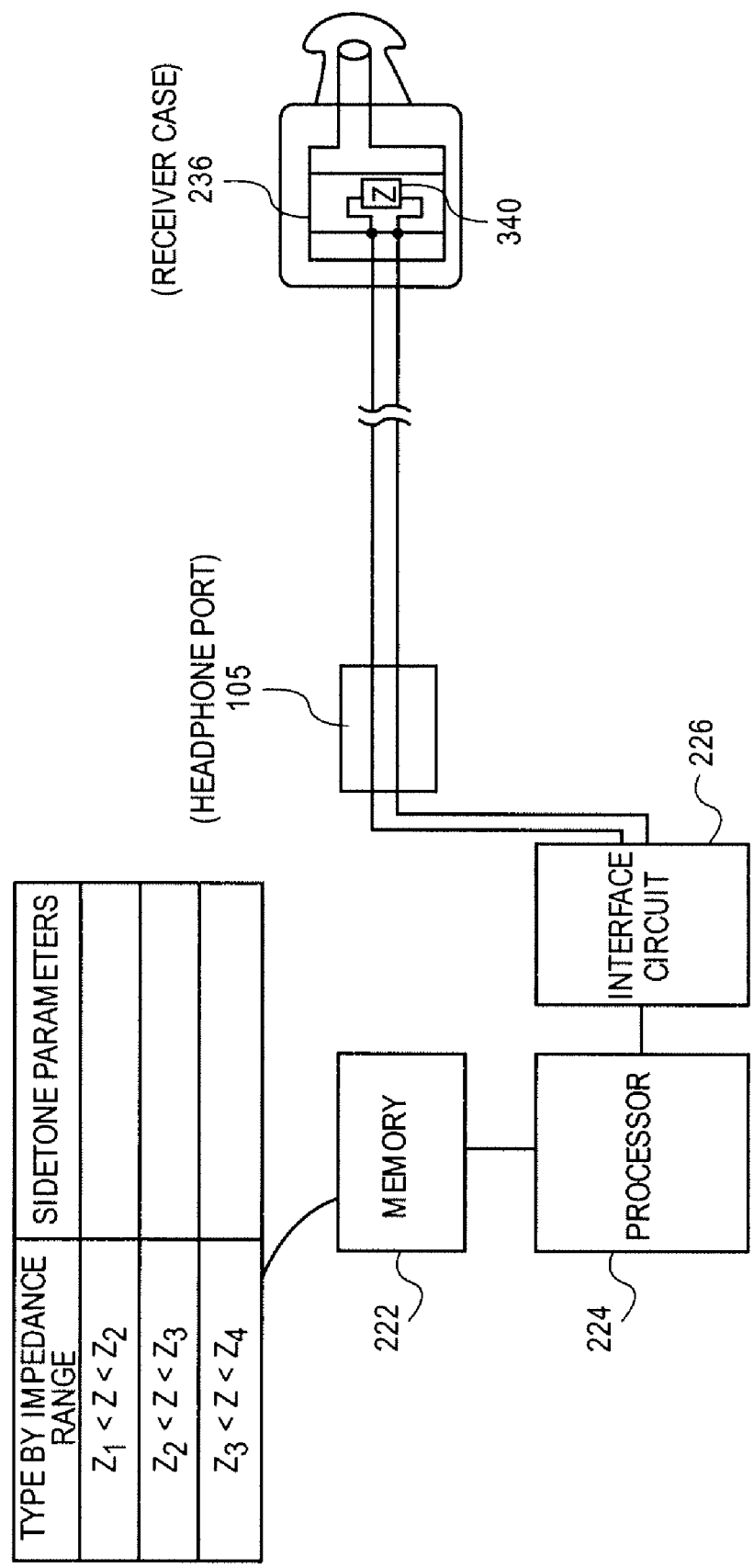
FIG. 3 shows a circuit diagram of an alternative technique for determining the type of connected earphone.

FIG. 3 depicts another technique for automatically determining the type of earphone that is connected. In this case, the device 100, through its processor 224 running a program stored in the memory 222, will measure or detect an impedance value, Z, through the headphone port 105 to which the earphone is connected. The impedance (340) may be a discrete or distributed impedance within, for example, the receiver case 236 of the earphone as shown. The interface circuit 226 may need to be provided with the requisite analog circuitry to make the impedance measurement through the headphone port 105. The processor 224 may then compare the measured impedance value Z to a number of previously stored, different impedance ranges (as depicted in FIG. 3). These ranges may have been previously determined and stored as a table in the memory 222, by the manufacturer of the device 100 for instance. Each contemplated earphone type may be identified by its respective impedance range. The stored table may also store, for each earphone type, a corresponding set of sidetone function parameters that have been previously determined, e.g. through testing by the manufacturer of the device 100.

Figure 4:
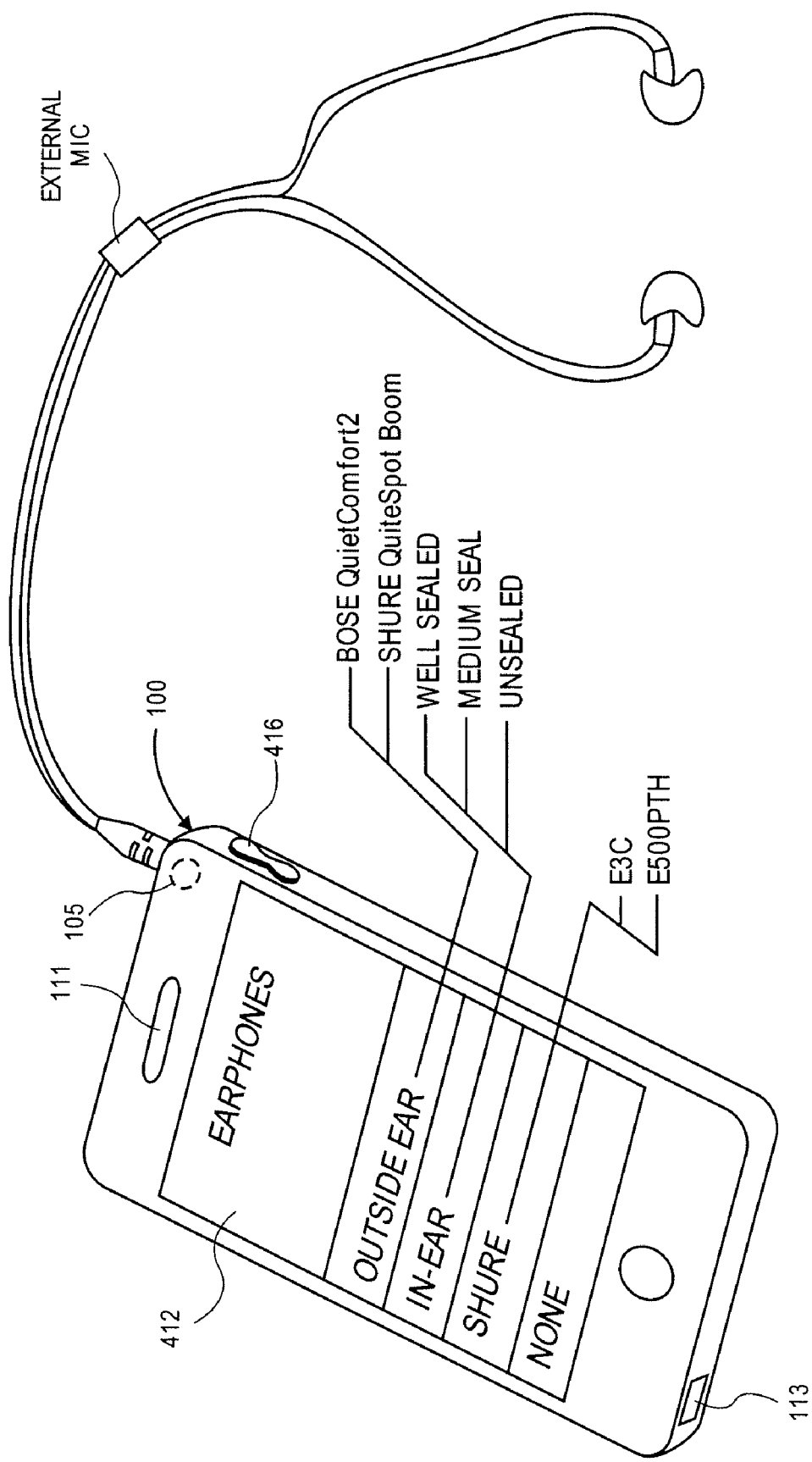
FIG. 4 depicts an example portable telephony device having a touch screen that is displaying earphone options for manual selection by the user.

Turning now to FIG. 4, an example portable telephony device 100 is depicted as having a touch screen 412 that is displaying earphone options for manual selection by the user. The touch screen 412 has on screen several virtual buttons that are associated with user-selectable earphone or headset profiles. These profiles cover different types of earphones, including in this example outside-ear, in-ear, SHURE and BOSE brand models, and none. There may be profiles that have text referring to earphone brand and/or model, text referring to earphone ear canal sealing level, and/or graphics depicting the earphone. Though not shown, each profile includes a respective set of sidetone parameters stored in the device 100. The user interface program running in the device 100 at this time will then receive a selection by the user, from the list virtual buttons associated with the different earphone profiles. The device 100 will then apply sidetone during the current (or subsequent) telephone call, in accordance with the respective sidetone parameters of the selection. In this manual approach, the user of the device 100 is expected to have knowledge of the particular type of earphone she will be connecting to the device. A similar, manual sidetone selection method may be invoked when a headset is detected for which there is no predefined profile stored in the device 100. In that case, there may be a virtual graphic equalizer option that is then displayed in the touch screen. This could prompt an advanced user to configure his own sidetone settings, and then stores and associates such configured sidetone settings with a profile for a new headset type. When the user selects a desired profile for this new headset type, its profile may be added to the look up table for future reference and automatic selection as previously described.

Figure 5:
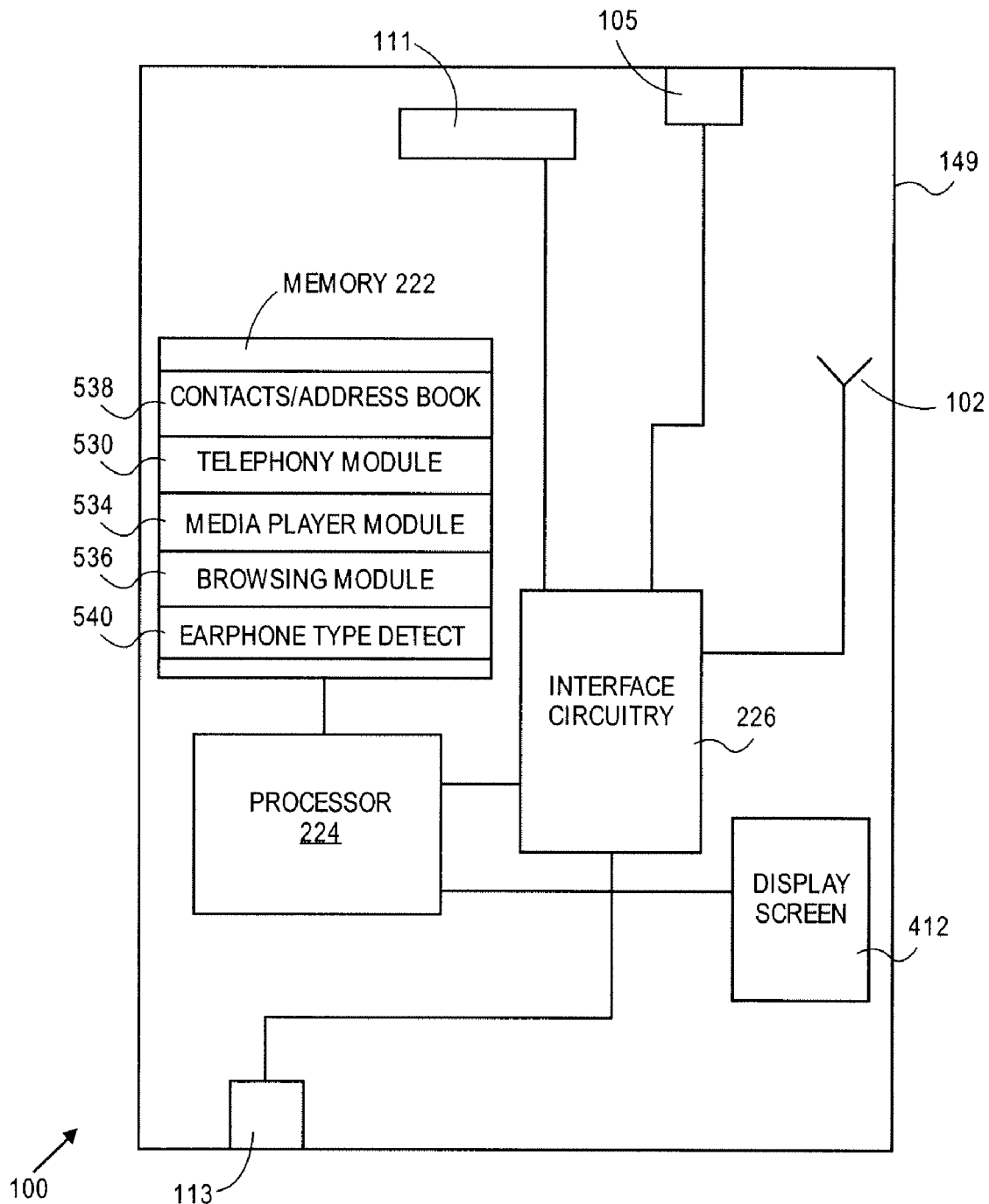
FIG. 5 is a more detailed block diagram of an example portable telephony device being a multi-function device that has sidetone selection ability for multiple types of earphones.

FIG. 5 shows a more detailed block diagram of an example portable telephony device 100 being a multi-function device that has the above-described sidetone selection ability. In this embodiment, the processor 224 (which may actually consist of one or more microprocessors or processor cores or microcontrollers) runs several programs or modules that are stored in memory 222, and which implement higher level functionality of the following processes: detecting the type of connected earphone or headset (module 540); initiating and disconnecting a wireless telephone call in response to input commands from the user, and answering an incoming call (telephony module 530), the retrieval and playback of digital media files such as compressed music files (media player module 534), a web browser application (browsing module 536), and the user's contacts/address book (module 538). The functions of the sidetone generator 108 and the earphone type detector 106 described above may be implemented for the most part by programming the processor 224, for example as part of the telephony module 530. The interface circuitry 226 may include various known hardware and/or software components that provide the needed translation between signals of the peripheral input/out components of the device 100 (e.g., receiver 111, microphone 113, headphone port 105, and antenna 102) and signaling by the processor 224. For example, the interface circuitry 226 may include an audio codec for use by the telephony and digital media player modules when processing input or output sound and voice signals, and a cellular baseband processor for use by the telephony module to work a telephone call over various cellular communication networks.

It should be noted that although the functions above, such as earphone or headset type detection and sidetone generation, are described as being implemented as part of certain modules, those functions may alternatively be implemented as part of different modules if doing so provides other advantages. For example, the type detection function might be implemented within an operating system program of the device 100, rather than as part of a higher layer application program.

To conclude, various aspects of a methodology for selecting the appropriate sidetone in a telephone device have been described. As explained above, an embodiment of the invention may be a machine-readable medium having stored thereon instructions which program a processor to perform some of the operations described above. In other embodiments, some of these operations might be performed by specific hardware components that contain hardwired logic. Those operations might alternatively be performed by any combination of programmed data processing components and custom hardware components.

A machine-readable medium may include any mechanism for storing information in a form readable by a machine (e.g., a computer or a processor), such as Compact Disc Read-Only Memory (CD-ROMs), Read-Only Memory (ROMs), Random Access Memory (RAM), and Erasable Programmable Read-Only Memory (EPROM).

The invention is not limited to the specific embodiments described above. For example, FIG. 2A and FIG. 3 depict the receiver case 236 (inside the earphone case 234) as containing the circuitry for the binary string 240 or impedance 340, both of which provide information about the type of earphone or headset. An alternative however may be to locate or house such circuitry in the casing of the external microphone (see FIG. 4). Accordingly, other embodiments are within the scope of the claims.

What is claimed is:

1. A machine-implemented method for operating a telephony device, comprising:
    automatically
        determining what type of earphone or headset is connected to the device by selecting from amongst a plurality of different types that include differing ear sealing levels, wherein the ear sealing levels indicate the air tightness between the earphone or headset and an ear,
        adjusting a sidetone function of the device, that is to be applied to produce sidetone in the connected earphone or headset, based on the determined type, and
        applying sidetone to the connected earphone or headset in accordance with said adjusted sidetone function.

2. The method of claim wherein said determining what type of earphone or headset comprises:
    reading a stored binary string through a headphone port of the device to which the earphone or headset is connected, wherein the stored binary string comprises identifiers for the connected earphone or headset by one of a) brand and model designation, b) serial number or unique identifier, and c) earphone design.

3. The method of claim 2 further comprising:
    making a wireless connection to a wireless headset, wherein the earphone is a part of the wireless headset.

4. The method of claim 1 wherein said determining what type of earphone or headset comprises:
    measuring an impedance value through a headphone port of the device to which the earphone or headset is connected, and comparing the measured impedance value to a plurality of previously stored, different impedance ranges, wherein each of the ranges is associated with a) a different type of earphone and b) a corresponding sidetone function parameter.

5. The method of claim 1 further comprising:
    placing the electronic device in its digital media player operating mode; and
    playing audio through the connected earphone or headset, while the device is in said digital media player operating mode, without applying the sidetone.

6. A machine-implemented method for operating a telephony device, comprising:
    automatically
        determining whether an earphone or headset that is connected to the device is or is not a sealing in-ear type, wherein sealing indicates the air tightness between the earphone or headset and an ear,
        adjusting a sidetone function of the device based on said determination, and
        applying sidetone to the connected earphone or headset, while the device is operating in its telephone mode working a telephone call, in accordance with said adjusted sidetone function.

7. The method of claim 6 wherein said adjusting a sidetone function comprises:

reducing a low frequency response and increasing a high frequency response of the sidetone function, when it is determined the earphone or headset is a sealing in-ear type.

8. A machine-implemented method for operating a portable telephony device, comprising:

displaying on a built-in screen of the device a plurality of user-selectable earphone or headset profiles each of which is associated with a respective sidetone parameter and has text that refers to its earphone's or headset's ear canal sealing level, wherein the ear canal sealing level indicates the isolation, due to contact between the earphone or headset and an ear, of a user from external sounds;

receiving a selection from the plurality of user-selectable earphone or headset profiles; and applying sidetone during a call, in accordance with the respective sidetone parameter of said selection.

9. The method of claim 8 wherein each of the user-selectable profiles has text that refers to its earphone's or headset's brand and/or model.

10. The method of claim 8 wherein each of the user-selectable profiles has an image of its earphone or headset.

11. The method of claim 8 wherein the user selectable profiles include profiles for a wired headset and a wireless headset.

12. A portable telephony device comprising:

a mobile phone housing having integrated therein a) memory to store an earphone type detect module, b) a telephony module, c) a headphone port, and d) a processor, the processor being coupled to the memory and the headphone port, and the earphone type detect module, when executed by the processor, is to determine what type of earphone or headset is connected to the headphone port, and the telephony module is to adjust a sidetone function of the device as a function of the determined type of earphone or headset based on one of the following earphone types: sealed in-ear, partially sealed in-ear, non-sealing in-ear, outside ear, and none, and apply sidetone in accordance with said adjusted sidetone function, wherein sealing indicates the air tightness between the earphone or headset and an ear.

13. The device of claim 12 wherein the earphone type detect module is to read a stored binary string through the headphone port to which an earphone is connected, wherein the stored binary string comprises identifiers for the connected earphone by one of a) brand and model designation, b) serial number or unique identifier, and c) earphone design.

14. The device of claim 12 wherein the headphone port is a wireless communications subsystem that is to connect with a wireless headset.

15. The device of claim 12 wherein the earphone type detect module is to measure an impedance value through the headphone port to which an earphone is connected, and compare the measured impedance value to a plurality of previously stored, different impedance ranges, wherein each of the ranges is associated with a) a different type of earphone and b) a corresponding sidetone function parameter.

16. A portable multifunction device comprising:

a mobile phone housing having integrated therein a) memory to store an earphone type detect module, a telephony module and a digital media player module, b) a headphone port, and c) a processor, the processor being coupled to the memory and the headphone port, the digital media player module, when executed by the processor, is to play sound without applying sidetone through the headphone port, the earphone type detect module, when executed by the processor, is to determine whether an earphone or headset that is connected to the headphone port is or is not a sealing in-ear type, wherein sealing indicates the isolation, due to contact between the earphone or headset and an ear, of a user from external sounds, and the telephony module, when executed by the processor, is to direct sound of a phone call, with sidetone in accordance with said determination, through the headphone port.

17. The device of claim 16 wherein the telephone module is to reduce a low frequency response and increase a high frequency response of the sidetone function, when it is determined the earphone or headset is a sealing in-ear type.

18. A portable telephony device comprising:

a mobile phone housing having integrated therein a) memory to store instructions, b) a headphone port, c) a processor, and d) a screen, the processor being coupled to the memory, the headphone port, and the screen, and the processor to execute the stored instructions to thereby display on the screen a plurality of user-selectable earphone or headset profiles, wherein each of the user-selectable profiles has text that refers to its headset's or earphone's ear canal sealing level, and apply sidetone in accordance with a selection made from the user-selectable earphone or headset profiles, wherein the ear canal sealing levels indicate the air tightness between the earphone or headset and an ear.

19. The device of claim 18 wherein each of the user-selectable profiles has text that refers to its headset's or earphone's brand and/or model.

20. The device of claim 18 wherein each of the user-selectable profiles has an image of its headset or earphone.

21. The device of claim 20 further comprising stored instructions in the memory that, when executed by the processor, prompt a user of the device when a detected headphone type is not in a stored table of assailable earphone or headset profiles 22. The device of claim 20 further sing stored instructions in the memory that, when executed by the processor, display a graphic equalizer on the screen, and then store sidetone settings in a new, user-selectable earphone or headset profile based on user interaction with the displayed graphic equalizer

* * * * *